(12) United States Patent
Corrigan et al.

(10) Patent No.: US 6,378,327 B1
(45) Date of Patent: Apr. 30, 2002

(54) ACCUMULATOR INSULATOR BRACKET

(75) Inventors: Dan Leonard Corrigan, Kingston; Ken Peter Cram, Belleville; Tim Russell Dickson, Kingston, all of (CA); Baldeep Singh Dhaliwal, Worester, MA (US); Kevin Joseph Goulet, Milford; Michael Francis Pilon, Ann Arbor, both of MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/672,653

(22) Filed: Sep. 28, 2000

Related U.S. Application Data

(60) Provisional application No. 60/156,796, filed on Sep. 30, 1999.

(51) Int. Cl.[7] .............................. F25B 43/00; B60H 1/32
(52) U.S. Cl. ............................................ 62/503; 62/239
(58) Field of Search ......................... 62/503, 239, 245, 62/295, 297, 474, 475; 29/890.06; 210/283

(56) References Cited

U.S. PATENT DOCUMENTS

| | | | |
|---|---|---|---|
| 5,449,035 A | * | 9/1995 | Strahle et al. |
| 5,479,790 A | * | 1/1996 | Bottum, Jr. et al. .......... 62/503 |
| 5,729,998 A | | 3/1998 | Grohs et al. |
| 6,041,618 A | | 3/2000 | Patel et al. |

FOREIGN PATENT DOCUMENTS

DE 4007004 A1 * 9/1991

* cited by examiner

Primary Examiner—Chen-Wen Jiang
(74) Attorney, Agent, or Firm—Larry I. Shelton

(57) ABSTRACT

An accumulator insulator bracket for an accumulator in an air conditioning system includes a housing having a cylindrical shape with a first closed end, a second closed end and a wall extending between the first closed end and the second closed end. The housing is longitudinally divided into a first housing member and a second housing member. The accumulator insulating bracket also includes an air flow directing rib extending radially from and axially along an interior portion of the housing wall, such that the rib defines an insulating air pocket between the wall and the accumulator and supports the accumulator.

20 Claims, 4 Drawing Sheets

ACCUMULATOR INSULATOR BRACKET

The present invention claims the priority date of co-pending U.S. Provisional Patent Application Serial No. 60/156,796, filed Sep. 30, 1999.

BACKGROUND OF THE INVENTION

1. Field of the Invention

The present invention relates generally to air conditioning systems and, more specifically, to an accumulator insulator bracket for an air conditioning system in a vehicle.

2. Description of the Related Art

It is known to provide an accumulator for an air conditioning system in a motor vehicle. The accumulator provides for the accumulation of liquid and liquid/vapor separation of a working fluid within the air conditioning system. Typically, an accumulator includes a housing having a first section and a second section, that are joined together to define an interior chamber. The housing also has an inlet opening through which a refrigerant may be introduced into the interior chamber, and an outlet opening through which refrigerant may exit the interior chamber. The accumulator also includes a separate inlet tube, outlet tube, oil return and desiccant bag disposed in the interior chamber of the housing. An example of an accumulator is disclosed in U.S. Pat. No. 5,729,998 to Grohs et al., issued Mar. 24, 1998, the disclosure of which is incorporated by reference.

Previously, the accumulator was attached to a portion of the air conditioning system, such as the evaporator case, using a bracket. An example of a bracket is a metal strap that wraps around the accumulator and is secured to a structure using a threaded fastener. While this type of bracket works well, a disadvantage is that it is difficult to consistently position the bracket during the vehicle assembly process.

It is known that the performance of the air conditioning system is affected by temperature variations of the liquid or liquid/vapor within the accumulator. Therefore, the accumulator is typically surrounded by an insulating device to insulate the accumulator from environmental temperature conditions, and also prevent heat transfer to the accumulator. An example of an insulating device is a foam sleeve having open ends. While the foam sleeve prevents a certain amount of heating, a disadvantage is a lower insulating efficiency since the accumulator is not completely encased. Another example of an insulting device is disclosed in U.S. Pat. No. 6,041,618 to Patel et al. entitled "Insulated Pressure Vessel Holder". This insulating device also has a sleeve shape, as well as a corrugated interior wall and an integral mounting bracket. In addition to the disadvantage of having an open-ended sleeve shape, a further disadvantage of this insulating device is that the corrugated shape of the sleeve encourages thermal contact between the sleeve and the accumulator, resulting in a decreased insulating value. Thus, there is a need in the art for an accumulator insulator bracket that efficiently and cost effectively insulates and supports the accumulator for an air conditioning system.

SUMMARY OF THE INVENTION

Accordingly, the present invention is an accumulator bracket for an accumulator in an air conditioning system. The accumulator bracket includes a housing having a cylindrical shape with a first closed end, a second closed end and a wall extending between the first closed end and the second closed end. The housing is longitudinally divided into a first housing member and a second housing member. The accumulator insulating bracket also includes an air flow directing rib extending radially from and axially along an interior portion of the wall of the housing, such that the rib defines an insulating air pocket between the wall and the accumulator and supports the accumulator.

One advantage of the present invention is that an accumulator insulator bracket is provided that integrates attachment and insulation of the accumulator into one structure. Another advantage of the present invention is that the accumulator insulator bracket has a clamshell shape to fully enclose the accumulator to prevent heat transfer. Still another advantage of the present invention is that an inside wall of the accumulator insulator bracket includes integrally molded-ribs optimally arranged to create air pockets around the outside of the accumulator that insulate the accumulator. A further advantage of the present invention is that the accumulator insulator bracket can be integrally molded with a housing for another component of the air conditioning system, such as the evaporator.

Other features and advantages of the present invention will be readily appreciated, as the same becomes better understood, after reading the subsequent description taken in conjunction with the accompanying drawings.

DESCRIPTION OF THE PREFERRED EMBODIMENT(S)

Figure 1:
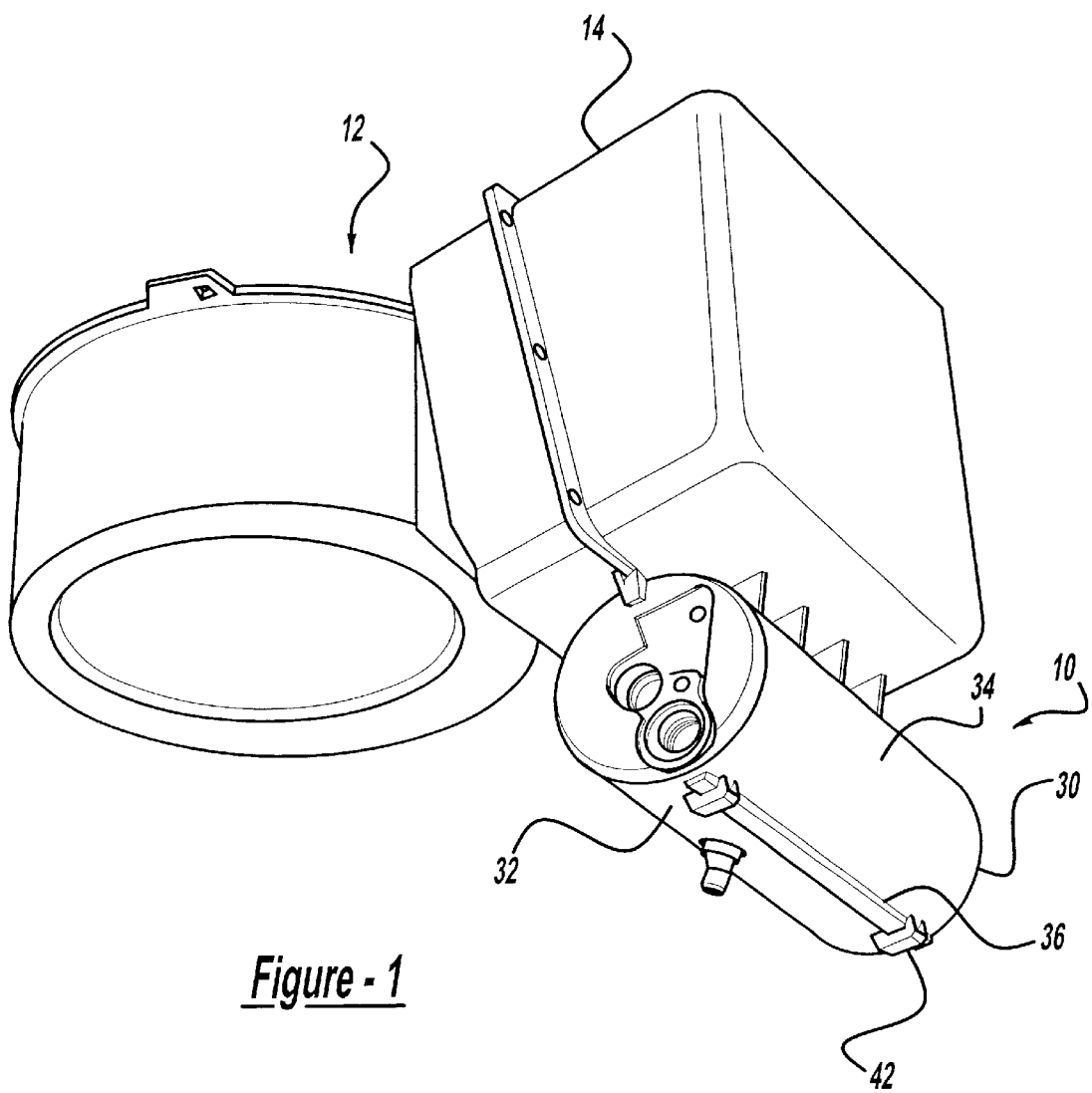
FIG. 1 is a perspective view of an accumulator insulator bracket, according to the present invention, illustrated in operational relationship with an air conditioning system.

Referring to the drawings and in particular FIG. 1, one embodiment of an accumulator insulator bracket 10, according to the present invention, is illustrated in operational relationship with a portion of an air conditioning system, generally indicated at 12, for a motor vehicle (not shown). The air conditioning system 12 includes a compressor (not shown), a condenser (not shown), a compressor (not shown), an evaporator 14, and an accumulator 16 operatively connected to transfer and condition a flow of air. It should be appreciated that the air conditioning system 12 is conventional and known in the art. It should also be appreciated that the accumulator 16 and accumulator insulator bracket 10 could be used for other air conditioning systems besides motor vehicles.

Figure 2:
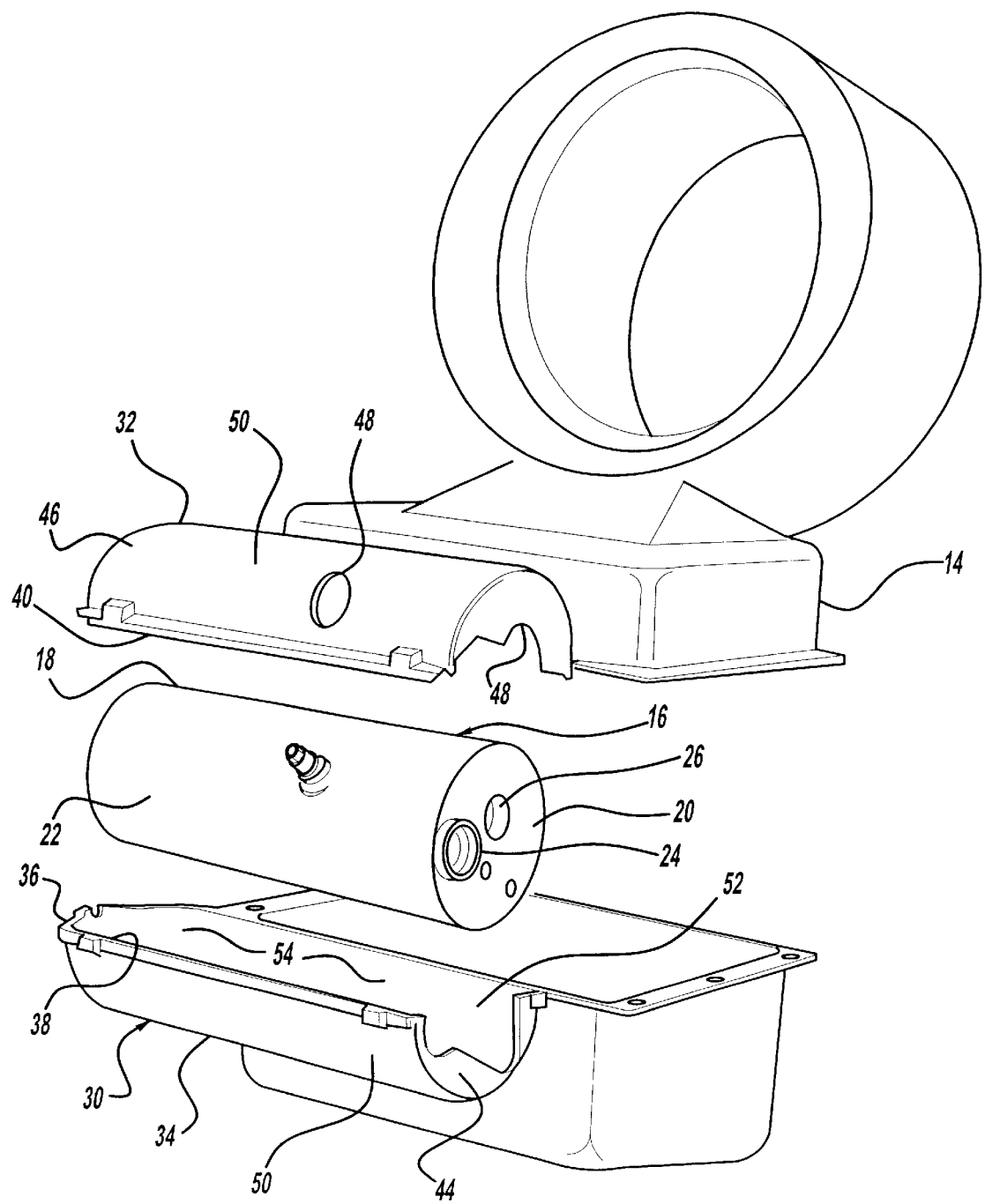
FIG. 2 is an exploded perspective view of the accumulator insulator bracket of FIG. 1 illustrated in operational relationship with an accumulator of the air conditioning system.
Figure 3:
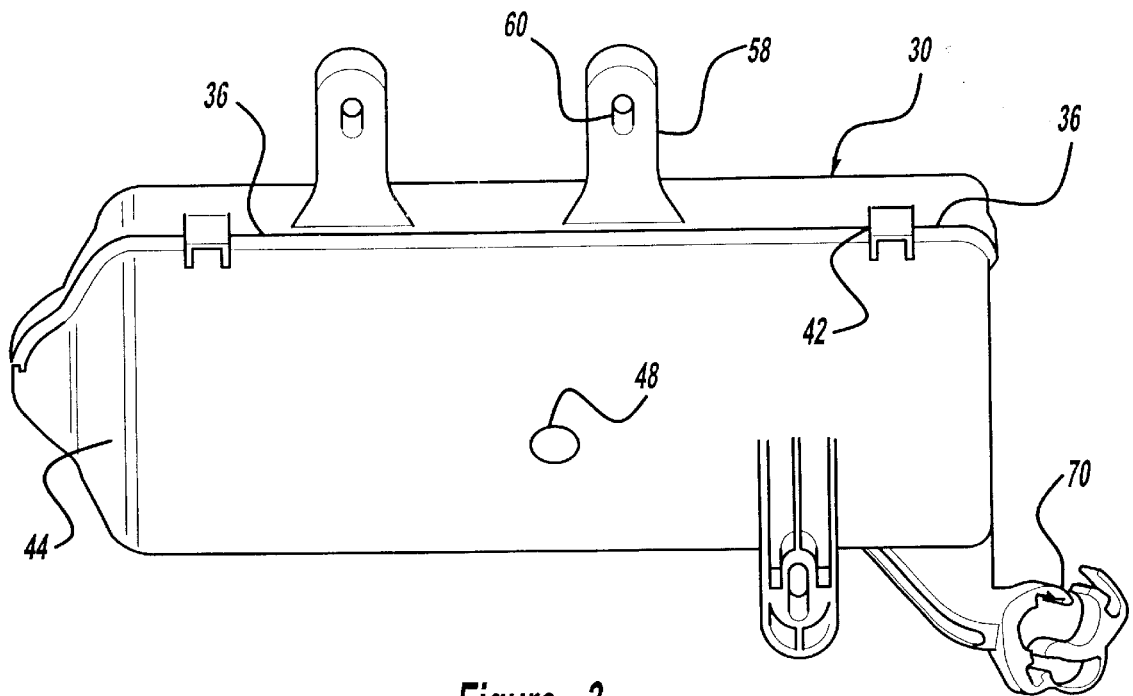
FIG. 3 is a side elevational view of the accumulator insulator bracket of FIG. 1.
Figure 4:
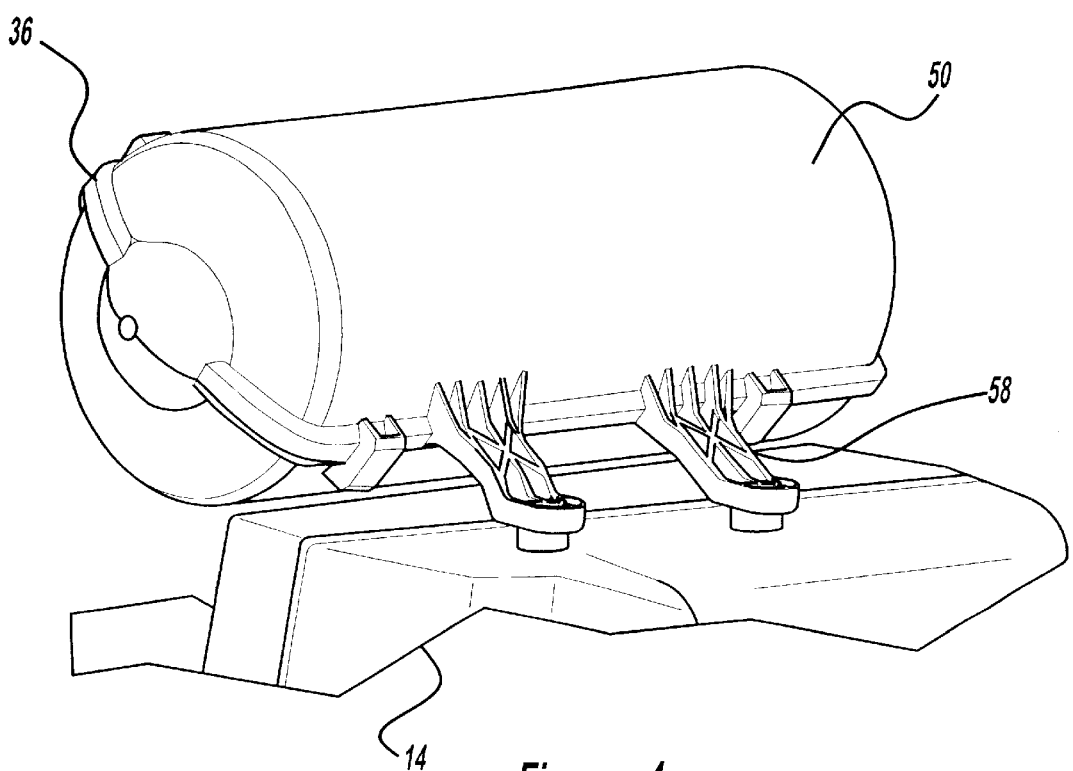
FIG. 4 is a perspective view of the accumulator insulator bracket of FIG. 1 attached to an evaporator housing.

Referring to FIG. 2, the accumulator 16, as is known in the art, includes an accumulator body or housing, generally indicated at 18, extending axially. The accumulator housing 18 is made of a metal material such as aluminum or steel. The accumulator housing 18 includes a top end portion 20, a bottom end portion (not shown) and a generally cylindrical sidewall or body portion 22 extending between the end portions. The accumulator housing 18 defines an interior chamber (not shown). The accumulator 16 includes an inlet opening 24 formed in the end portion 20 for an inlet tube (not shown). Liquid and gaseous refrigerant such as freon circulating from the evaporator 14 and through the inlet tube are introduced into the interior chamber through the inlet opening 24. It should be appreciated that the refrigerant may contain oil mixed therewith.

The accumulator 16 also includes an outlet opening 26 formed in the end portion 20 for an outlet tube (not shown). The accumulator 16 includes other components, such as a switch tube (not shown), filter (not shown), seal (not shown), or an insert (not shown). It should be appreciated that these components are conventional and known in the art. The accumulator 16 is held in place by the accumulator insulator bracket 10, as illustrated in FIGS. 1 and 2. Advantageously, the accumulator insulator bracket 10 insulates and fixedly locates the accumulator 16 within the air conditioning system 12 in a manner to be described.

Referring to FIGS. 2 through 5, the accumulator insulator bracket 10 includes a housing 30 having a generally cylindrical shape. Preferably, the housing 30 is made from a plastic material, such as polypropylene. The housing 30 is longitudinally separable into a first housing member 32 and a second housing member 34 joined together in abutting relationship at a predefined seam location generally shown at 36. The first housing member 32 and second housing member 34 are secured together using a conventional joining technique, such as tongue and groove. For example, an outer edge of the second housing member 34 includes a grooved portion 38 for receiving a tongue 40 extending from an outer edge of the first housing member 32, to form a tongue and groove connection, as is known in the art. The first housing member 32 and second housing member 34 are securely retained together, using a fastener such as a retaining clip 42, screw (not shown), self-lock (not shown) or the like. An example of a retaining clip 42 is a "U"-shaped spring clip, as is known in the art.

The housing 30, including the first housing member 32 joined to the second housing member 34, includes a first and second closed ends 44, and a wall 46 extending between the first and second closed ends 44. The wall 46 includes an exterior portion 50 and an interior portion 52 defining an interior chamber 54 of the accumulator insulator bracket 10. The interior portion 52 of the wall 46 includes airflow directing ribs 56 extending radially from the interior wall 52 a predetermined distance and longitudinally along the interior wall 52 a predetermined distance. The ribs are integrally molded with the wall 46. Preferably, the ribs 56 extend from and along the interior wall 52 a sufficient amount so that the accumulator 16 rests on the ribs 56 when disposed within the accumulator insulator bracket 10. The airflow directing ribs 56 are optimally positioned to form a plurality of air pockets between the interior wall 52 and the accumulator 16. Air is a known insulator, and air within the air pockets insulates the accumulator 16. It should be appreciated that an insulating value for the accumulator insulator bracket 10 can be modified by varying the size and number of ribs 56 and resulting air pockets. Preferably, the accumulator insulator bracket 10 has a minimal number of ribs 56 to reduce thermal contact between the accumulator 16 and the accumulator insulator bracket 10, while still stabilizing the accumulator 16. It should also be appreciated that the ribs 56 are sufficiently flexible to dampen any vibration transmitted from the vehicle to the accumulator 16.

The housing 30 may include an aperture 48 for a protracted member of the accumulator such as a tube or switch (not shown) or the like to extend therethrough. The housing 30 includes a seal 49 surrounding the aperture 48 to prevent any air transfer. Preferably, the seal 49 is a thin wall having a predetermined thickness. Preferably, the wall is thin to fold over and form a gasket-like seal between the housing 30 and the accumulator 16.

The accumulator insulator bracket 10 also includes an attachment bracket 58 integrally molded into the housing 30 for attaching the accumulator insulator bracket 10 to a fixed structure, such as the evaporator 14. The attachment bracket 58 may be an integrally molded flange extending outwardly from the housing 30. The attachment bracket 58 has an aperture 60 for securing the attachment bracket 58 to the fixed structure, such as by bolting.

The accumulator insulator bracket 10 further provides a support surface for locating a line or the like (not shown). For example, a locking clip 70 having a "C" shape, as is known in the art, extends from the exterior portion of the wall 46. Preferably, the locking clip 70 is integrally molded with the housing 30.

Figure 5A:
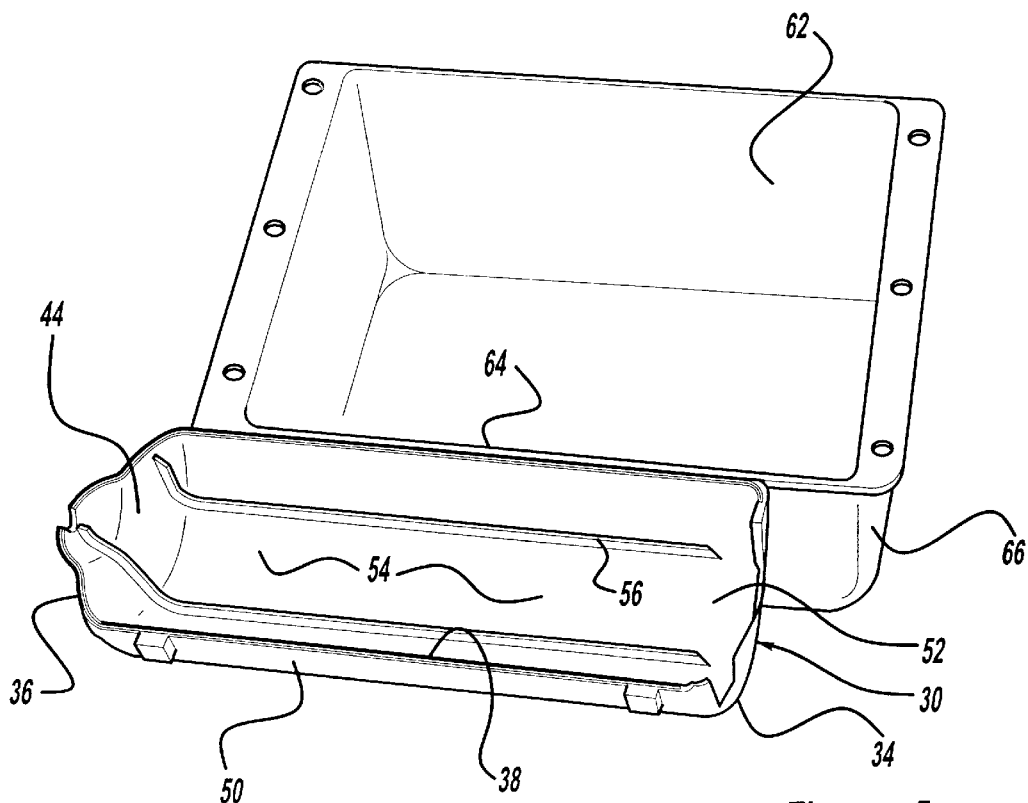
FIGS. 5A and 5B are perspective views of another embodiment, according to the present invention, of the accumulator insulator bracket of FIG. 1.
Figure 5B:
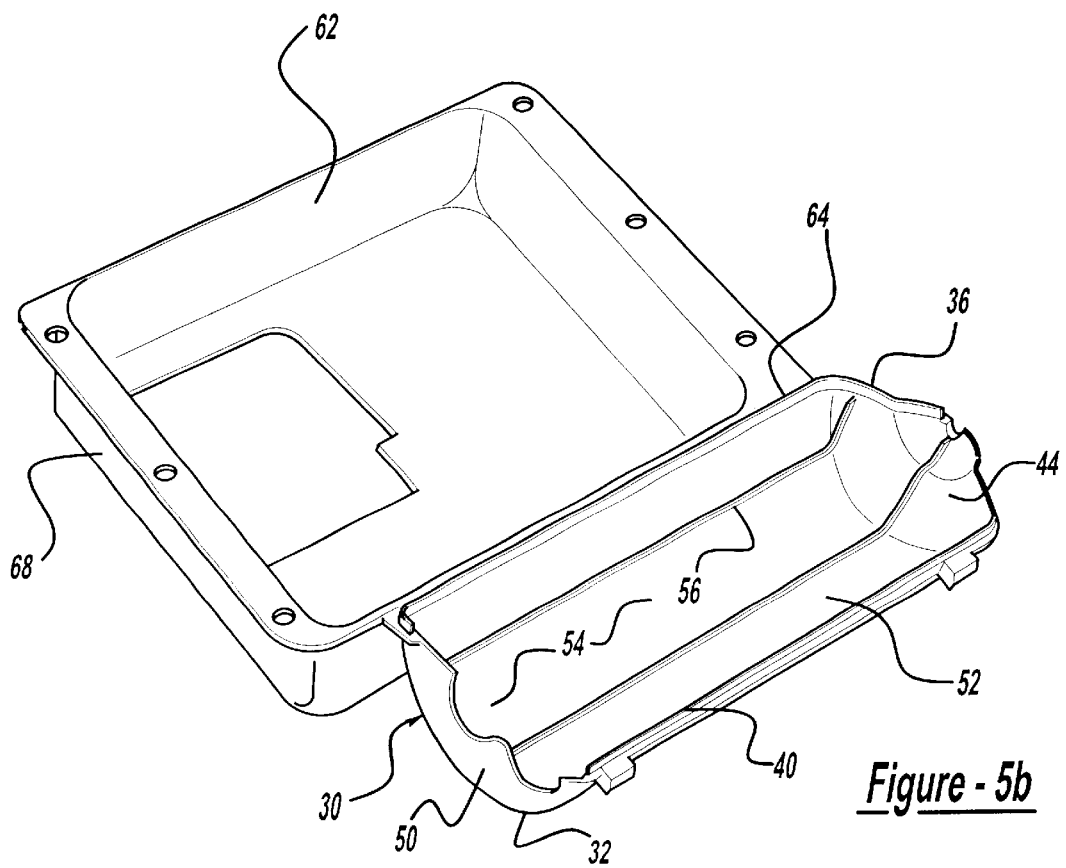

Referring to FIGS. 5A and 5B, another embodiment for attaching the accumulator insulator bracket 10 is illustrated. in this embodiment, the accumulator insulator bracket 10 is integrally molded with an evaporator housing 62 as shown at 64. That is, the first housing member 32 for the accumulator insulator bracket 10 is integrally molded with a first evaporator housing member 66, and the second housing member 34 for the accumulator insulator bracket 10 is integrally molded with a first evaporator housing member 68. Preferably, the two integral halves of the evaporator 14 and the accumulator insulator bracket 10 are joined together and secured, such as by using a retaining clip 42, as previously described. It should be appreciated that one housing member 32 or 34, for the accumulator insulator bracket 10 can be integrally molded with a corresponding evaporator housing member, and the other housing member for the accumulator insulator bracket 10 can be securely retained to the assembly, as previously described.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. An accumulator insulator bracket for an accumulator in an air conditioning system comprising:

a housing having a cylindrical shape including a first closed end, a second closed end and a wall extending between said first closed end and said second closed end, said housing being longitudinally divided into a first housing member and a second housing member; and an air flow directing rib extending radially from and axially along an interior portion of said wall, wherein said rib defines an insulating air pocket between said wall and the accumulator and supports the accumulator.

2. An accumulator insulator bracket as set forth in claim 1 including a tongue and groove connection for securing said first housing member and said second housing member together.

3. An accumulator insulator bracket as set forth in claim 1 including a retaining clip for securing said first housing member and said second housing member together.

4. An accumulator insulator bracket as set forth in claim 1 wherein said housing includes an aperture and a seal formed in said housing surrounding the aperture.

5. An accumulator insulator bracket as set forth in claim 1 wherein said housing includes an integrally molded support.

6. An accumulator insulator bracket as set forth in claim 1 wherein said housing includes an attachment bracket integrally formed in said housing for mounting said accumulator insulator bracket.

7. An accumulator insulator bracket as set forth in claim 1 wherein said first and said second housing member for the accumulator is integrally formed with a first and second housing member for another component in the air conditioning system.

8. An accumulator insulator bracket as set forth in claim 1 wherein said accumulator insulator bracket includes a plurality of ribs positioned to reduce thermal contact with the accumulator and support the accumulator.

9. An accumulator insulator bracket for an accumulator in an air conditioning system of a vehicle comprising:

a housing having a cylindrical shape including a first closed end, a second closed end and a wall extending between said first closed end and said second closed end, said housing being longitudinally divided into a first housing member and a second housing member;

an air flow directing rib extending radially from and axially along an interior portion of said wall, wherein said rib defines an insulating air pocket between said wall and the accumulator and supports the accumulator; and an attachment bracket integrally formed in said housing for mounting said accumulator insulator bracket.

10. An accumulator insulator bracket as set forth in claim 9 including a tongue and groove connection for securing said first housing member and said second housing member together.

11. An accumulator insulator bracket as set forth in claim 9 including a retaining clip for securing said first housing member and said second housing member together.

12. An accumulator insulator bracket as set forth in claim 9 wherein said housing includes an aperture and a seal formed in said housing surrounding the aperture.

13. An accumulator insulator bracket as set forth in claim 9 wherein said housing includes an integrally molded support.

14. An accumulator insulator bracket as set forth in claim 9 wherein said accumulator insulator bracket includes a plurality of ribs positioned to reduce thermal contact with the accumulator and support the accumulator.

15. An accumulator insulator bracket for an accumulator in an air conditioning system of a vehicle comprising:

a first longitudinally extending housing member and a second longitudinally extending housing member joined to said first longitudinally extending housing member, wherein said first longitudinally extending housing member and said second longitudinally extending housing member have a generally cylindrical shape including a first closed end, a second closed end and a wall extending between said first closed end and said second closed end;

wherein said first longitudinally extending housing member and said second longitudinally extending housing member for the accumulator is integrally formed with a first and second housing member for another component in the air conditioning system; and an air flow directing rib extending radially from and axially along an interior portion of said wall, wherein said rib defines an insulating air pocket between said wall and the accumulator and supports the accumulator.

16. An accumulator insulator bracket as set forth in claim 15 including a tongue and groove connection for securing said first housing member and said second housing member together.

17. An accumulator insulator bracket as set forth in claim 15 including a retaining clip for securing said first housing member and said second housing member together.

18. An accumulator insulator bracket as set forth in claim 15 wherein said housing includes an aperture and a seal formed in said housing surrounding the aperture.

19. An accumulator insulator bracket as set forth in claim 15 wherein said housing includes an integrally molded support.

20. An accumulator insulator bracket as set forth in claim 15 wherein said accumulator insulator bracket includes a plurality of ribs positioned to reduce thermal contact with the accumulator and support the accumulator.

* * * * *